United States Patent
Schermer et al.

(10) Patent No.: US 10,355,785 B2
(45) Date of Patent: Jul. 16, 2019

(54) DELAY-MODULATION-BASED NON-UNIFORM OPTICAL SAMPLING AND FREQUENCY DISAMBIGUATION

(71) Applicant: The United States of America, as represented by the Secretary of the Navy, Washington, DC (US)

(72) Inventors: Ross Schermer, Fairfax Station, VA (US); Jason D. McKinney, Bowie, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/015,281

(22) Filed: Jun. 22, 2018

(65) Prior Publication Data
US 2018/0375586 A1    Dec. 27, 2018

Related U.S. Application Data

(60) Provisional application No. 62/523,353, filed on Jun. 22, 2017, provisional application No. 62/578,601, filed on Oct. 30, 2017.

(51) Int. Cl.
| H04B 10/524 | (2013.01) |
|---|---|
| H04B 10/67 | (2013.01) |
| H04B 10/50 | (2013.01) |

(52) U.S. Cl.
CPC ......... *H04B 10/524* (2013.01); *H04B 10/503* (2013.01); *H04B 10/67* (2013.01)

(58) Field of Classification Search
CPC .......................... H04B 10/505; H04B 10/524
See application file for complete search history.

(56) References Cited

U.S. PATENT DOCUMENTS

| 6,239,866 B1 * | 5/2001 | Bromage ................. G01J 11/00 356/5.01 |
|---|---|---|
| 2016/0087716 A1 * | 3/2016 | McKinney ........... H04B 10/079 398/25 |

* cited by examiner

*Primary Examiner* — Shi K Li
(74) *Attorney, Agent, or Firm* — US Naval Research Laboratoy; William P. Ladd (57) ABSTRACT

Systems and methods are provided for non-uniform optical sampling with wider optical bandwidth and lower timing jitter than conventional systems, which can make non-uniform optical sampling more feasible. Embodiments of the present disclosure further provide systems and methods for determining all input signal frequencies, including those left ambiguous by prior methods.

20 Claims, 11 Drawing Sheets

DELAY-MODULATION-BASED NON-UNIFORM OPTICAL SAMPLING AND FREQUENCY DISAMBIGUATION

CROSS REFERENCE TO RELATED APPLICATIONS

This application claims the benefit of U.S. Provisional Patent Application No. 62/523,353, filed on Jun. 22, 2017, and U.S. Provisional Patent Application No. 62/578,601, filed on Oct. 30, 2017 both of which are incorporated by reference herein in their entireties.

FIELD OF THE DISCLOSURE

This disclosure relates to optical systems, including optical sampling systems.

BACKGROUND

In traditional analog-to-digital conversion (ADC), a signal is sampled uniformly, with constant time between samples, at a rate that is at least twice its maximum signal frequency. However, at higher sampling rates (e.g., on the order of 1 GHz and above) ADC performance is relatively poor. As a result, traditional analog-to-digital conversion is limited to signals at lower frequencies. For signals at higher frequencies, an alternative is to instead sub-sample the signal, at a rate that is less than twice the maximum signal frequency. This causes the sub-sampled signal to have a frequency spectrum that is "folded" with respect to the original. As a result, signals at frequencies that are separated by multiples of the sampling frequency will fold onto one another.

Furthermore, as signal frequency increases, the temporal uncertainty of each sample (i.e., timing jitter) becomes a limiting factor in ADC performance. This has motivated the use of pulsed lasers as optical samplers in recent years, due to their ability to provide timing jitter that is orders of magnitude better than electronic samplers. However, sub-sampling using pulsed lasers has the same problem that signal frequencies fold onto one another.

A potential solution to the frequency ambiguity introduced by sub-sampling is to use non-uniform sub-sampling, in which the sample-to-sample timing is non-uniform. This provides additional information that can be used to determine the signal frequency from the sub-sampled signal and has been demonstrated using both electronic sampling and optical sampling. However, non-uniform, electronic samplers are limited by timing jitter. In conventional systems, the limited optical bandwidth of an electronically-generated optical pulse source can limit non-uniform optical sampling. Further, conventional systems do not distinguish all signal frequencies in the sub-sampled frequency spectrum.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

Embodiments of the present disclosure provide systems and methods for non-uniform optical sampling with wider optical bandwidth and lower timing jitter than conventional systems, which can make non-uniform optical sampling more feasible. Embodiments of the present disclosure further provide systems and methods for determining all input signal frequencies, including those left ambiguous by prior methods.

Embodiments of the present disclosure provide systems and methods for strongly modulating the time between pulses (inter-pulse time spacing) of a pulsed optical source, such as a pulsed laser. In an embodiment, this is based on the combination of a delay modulator with a pulsed optical source.

Embodiments of the present disclosure provide systems and methods for optically sampling or sub-sampling a signal (e.g., a radio frequency (RF) signal, an optical signal, or a signal on an optical carrier) at a modulated, non-uniform rate. In an embodiment, sub-sampling refers to sampling at rates less than twice the maximum signal frequency. In an embodiment, systems and methods for optically sampling or sub-sampling a signal at a modulated, non-uniform rate are based on the combination of a pulsed optical source, delay modulator, and optical transducer.

Embodiments of the present disclosure provide systems and methods for converting the frequency of a signal (e.g., a radio frequency (RF) signal, an optical signal, or a signal on an optical carrier), via optical sub-sampling, at a modulated, non-uniform rate. In an embodiment, systems and methods for converting the frequency of a signal, via optical sub-sampling, at a modulated, non-uniform rate are based on the combination of a pulsed optical source, delay modulator, optical transducer, and photo-detector.

Embodiments of the present disclosure provide systems and methods for determining the frequency of a signal (e.g., a radio frequency (RF) signal, an optical signal, or a signal on an optical carrier), via optical sub-sampling at a modulated, non-uniform rate. In an embodiment, systems and methods for determining the frequency of a signal, via optical sub-sampling at a modulated, non-uniform rate are based on: the combination of a pulsed optical source, delay modulator, optical transducer, and photodetector; the use of appropriate delay-modulation waveforms; and/or processing/analysis of the resulting sub-sampled signal.

Embodiments of the present disclosure provide systems and methods for measurement and processing of signals in the ultra high frequency (UHF) (e.g., between 300 MHz and 3 GHz), super high frequency (SHF) (e.g., between 3 and 30 GHz), extremely high frequency (EHF) (e.g., 110 to 300 GHz), and tremendously high frequency (THF) (i.e. terahertz radiation) frequency bands (e.g., 300 GHz to 3 THz). This includes high-performance analog-to-digital conversion of electronic signals in these frequency bands, which is problematic using conventional analog-to-digital converters (ADCs).

Using a non-uniform sub-sampler in accordance with an embodiment of the present disclosure can enable microwave frequencies spanning a range exceeding 200 Nyquist zones to be aliased to a single zone, with modulation sidebands added that uniquely identify the input signal frequency. Systems and methods in accordance with embodiments of the present disclosure can enable wideband spectral folding and frequency disambiguation, using a single sampler that is based on a high-stability pulsed laser.

2. Exemplary Optical Sampler

Embodiments of the present disclosure provide systems and methods for modulating the time between pulses of a pulsed laser (e.g., an optical clock), optical sampling (e.g., of electronic and optical signals) at a non-uniform rate, and frequency disambiguation of sub-sampled (e.g., aliased) signals. Systems and methods in accordance with embodiments of the present disclosure can enable wideband signal detection, measurement, and processing with low size, weight, power, and cost.

Embodiments of the present disclosure include an optical sampler. In an embodiment, the optical sampler is a non-uniform optical sampler. In an embodiment, the optical sampler includes a pulsed laser and an external modulator, such as an acousto-optic delay modulator (AODM). In an embodiment, the optical sampler can be used for non-uniform optical sub-sampling, over a wide signal bandwidth, of a photonic link.

Figure 1A:
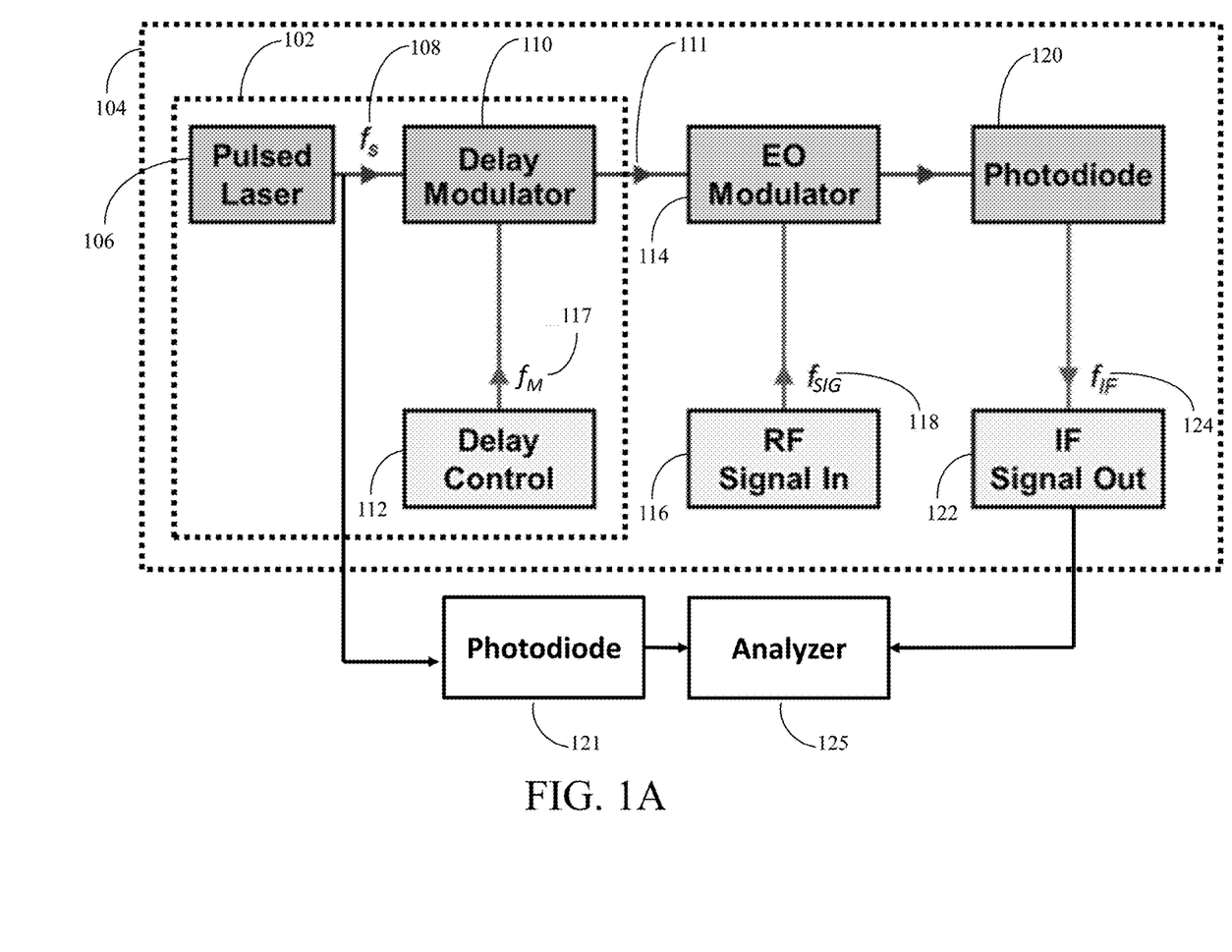
FIG. 1A is a block diagram of an exemplary system for determining the frequency of an input signal comprising an optical sampler utilized in a sampled photonic link in accordance with an embodiment of the present disclosure.

FIG. 1A is a block diagram of an exemplary system for determining the frequency of an input signal comprising an optical sampler utilized in a sampled photonic link in accordance with an embodiment of the present disclosure. In FIG. 1A, sampled photonic link 104 includes optical sampler 102 (e.g., a non-uniform optical sampler), electro-optic (EO) modulator (e.g., an EO intensity modulator) 114, and photodiode 120. In FIG. 1A, sampler 102 includes laser 106 (e.g., a pulsed laser) that generates a laser signal $f_s$ 108, which is input to delay modulator (e.g., an acousto-optic (AO) delay modulator) 110. In an embodiment, laser 106 is a mode-locked laser (MLL). Alternatively, in an embodiment, laser 106 can be replaced with any pulsed source.

In an embodiment, delay modulator 110 can be an AO modulator. In an embodiment, delay modulator 110 is used to perform delay modulation of laser signal 108, which produces a non-uniformly spaced optical pulse train, which can subsequently sub-sample signals in sampled photonic link 104. In an embodiment, the uniformly spaced pulse output of laser signal $f_s$ 108 generated by laser 106 passes through delay modulator 110, and the transit time (i.e., delay) of delay modulator 110 is modulated to produce a non-uniformly spaced pulse sequence.

In an embodiment, delay modulator 110 is controlled via delay controller 112, which can generate a control signal with frequency $f_M$ 117. In an embodiment, delay controller 112 generates a sampling signal modulated by a frequency $f_M$ 117, which is input to EO modulator 114. In an embodiment, an input signal (e.g., a radio frequency (RF) signal) 116 is input to sampled photonic link 104, via EO modulator 114, at an input signal frequency $f_{SIG}$ 118. In an embodiment, photodiode 120 generates an output signal 122 at output signal frequency $f_{IF}$ 124. For example, in an embodiment, input signal(s) 116 input to the EO modulator 114 are sampled by optical pulses from laser 106 of optical sampler 102 and are subsequently converted to output signal(s) 122 by photodiode 120.

In an embodiment, output signal frequency $f_{IF}$ 124 can be analyzed by an external device. For example, high frequency signals are difficult to digitize, and the output signal frequency $f_{IF}$ 124 signals generated by photodiode 120 are substantially easier to digitize, enabling them to be more easily analyzed. In an embodiment, output signal(s) 122 can be sent to an analyzer 125 (e.g., an electrical spectrum analyzer (ESA)) for analysis. In an embodiment, analyzer 125 also receives a laser reference signal from laser 106. For example, in an embodiment, a portion of laser signal $f_s$ 108 can be tapped off and sent to photodiode 121. In an embodiment, photodiode 121 converts the light of laser signal $f_s$ 108 into a signal to be sent to analyzer 125. In an embodiment, photodiode 121 is part of laser 106. In an embodiment, photodiode 121 is part of analyzer 125.

Elements of the system of FIG. 1A can be implemented using hardware, software, and/or a combination of hardware and software. For example, in an embodiment, all elements of FIG. 1A can be implemented using a single device. In an embodiment, sampler 102 can be implemented using a single device. In an embodiment, sampled photonic link 104 can be implemented using a single device. In an embodiment, sampler 102 and sampled photonic link 104 can be implemented using a single device. In an embodiment, analyzer 125 can be implemented as part of sampler 102 or sampled photonic link 104.

Analyzer 125 can be implemented using hardware, software, and/or a combination of hardware and software. FIG. 1C is a diagram of an exemplary implementation of analyzer 125 in accordance with an embodiment of the present disclosure. In an embodiment, analyzer 125 includes an analog to digital converter (ADC) 123, and output signal(s) 122 can optionally be digitized by ADC(s) 123 prior to being analyzed. In an embodiment, the digitized output signal from ADC 123 is sent to processor 144 for analysis. In an embodiment, analyzer 125 includes frequency counter 140, which determines the repetition of frequency of laser signal $f_s$ 108 sent from photodiode 121. In an embodiment, frequency counter 140 outputs a signal representative of laser signal $f_s$ 108 to processor 144 for analysis. While frequency counter 140 is shown in FIG. 1C, it should be understood that analyzer 125 can include other circuitry, modules, and/or methods for sending a signal from photodiode 121 to processor 144. In an embodiment, analyzer 125 can also include a memory 142 (e.g., for storing information from processor 144 and/or information from laser signal $f_s$ 108 and/or photodiode 121).

In an embodiment, using the information from frequency counter 140 and ADC 123, processor 144 can determine the input signal frequency $f_{SIG}$ 118 very accurately with a very small error (e.g., based on the frequency error of ADC 123). For example, the input signal frequency $f_{SIG}$ 118 can be so high that no electronic ADC can digitize it. Thus, embodiments of the present disclosure enable input signal 116 to be sampled and aliased so that input signal frequency $f_{SIG}$ 118 can be digitized and determined.

In an embodiment, the combination of laser 106 and AO delay modulator 110 enables relatively strong modulation of the sampling rate compared to electro-optic (EO) phase modulators (e.g., as in EO modulator 114) because, for example, the range of delay that AO delay modulator 110 can control is 1000 times higher than the range of delay that an EO modulator can control. For example, in an embodiment, when sampler 102 was utilized in sampled photonic link 104 in an experiment, the disambiguation of input signal frequencies greater than 80 times the Nyquist frequency limit was demonstrated. Input signal frequencies $f_{SIG}$ 118 exceeding the Nyquist frequency $f_N = f_s/2$, where $f_s$ is the pulse repetition frequency of laser 106, were aliased to output signal frequency $f_{IF}$ 124. In an embodiment, an equation for the value of $f_{IF}$ 124 is given by Equation (1):

$$f_{IF} = \left| f_{SIG} - \frac{M f_s}{2} \right| \quad (1)$$

where $$M = 2 \cdot \text{floor}\left(\frac{N}{2}\right) \quad (2)$$

where N is the Nyquist zone of input signal 116, an integer that minimizes $f_{IF}$ 124.

In an embodiment, passing pulses from laser 106 through delay modulator 110 enables the optical pulse spacing, and thus the sampling rate, to be modulated. By modulating the delay at a constant frequency $f_M$, a continuous wave (CW) signal launched into EO modulator 114 can result in an output signal with a carrier at frequency $f_{IF}$ 124 and modulation sidebands at frequencies $f_{IF}$ 124 $\pm f_M$.

In an embodiment, the delay modulation waveform used to determine the input signal frequency from the sub-sampled output signal can have various forms. In an embodiment, two delay modulation signals can be simultaneously applied as an input to delay modulator 110. For example, in an embodiment, a sine wave at 10 kHz (e.g., for disambiguation of adjacent even/odd Nyquist zone pairs) was used as a first delay modulation signal $f_{M1}$, and a ramp function at 12.5 kHz (e.g., for disambiguation of even and odd Nyquist zones) was used as a second delay modulation signal $f_{M2}$. In an embodiment, both of these signals were input into delay modulator 110 as $f_M$ 117. In an embodiment, the laser pulse repetition frequency was 50.476 MHz. In an embodiment, the pulse repetition frequency of laser 106 can be changed. In an embodiment, changing the pulse repetition frequency changes the input signal frequency range corresponding to each Nyquist zone and thus the operational input signal frequency range.

In an embodiment, delay modulation using a single ramp function can be used. In an embodiment, delay modulation using ramp functions of different polarities (e.g., rising or falling) can be used. Further, embodiments of the present disclosure can include the combination of delay modulation with amplitude and/or phase modulation.

3. Exemplary Delay Modulator

Figure 1B:
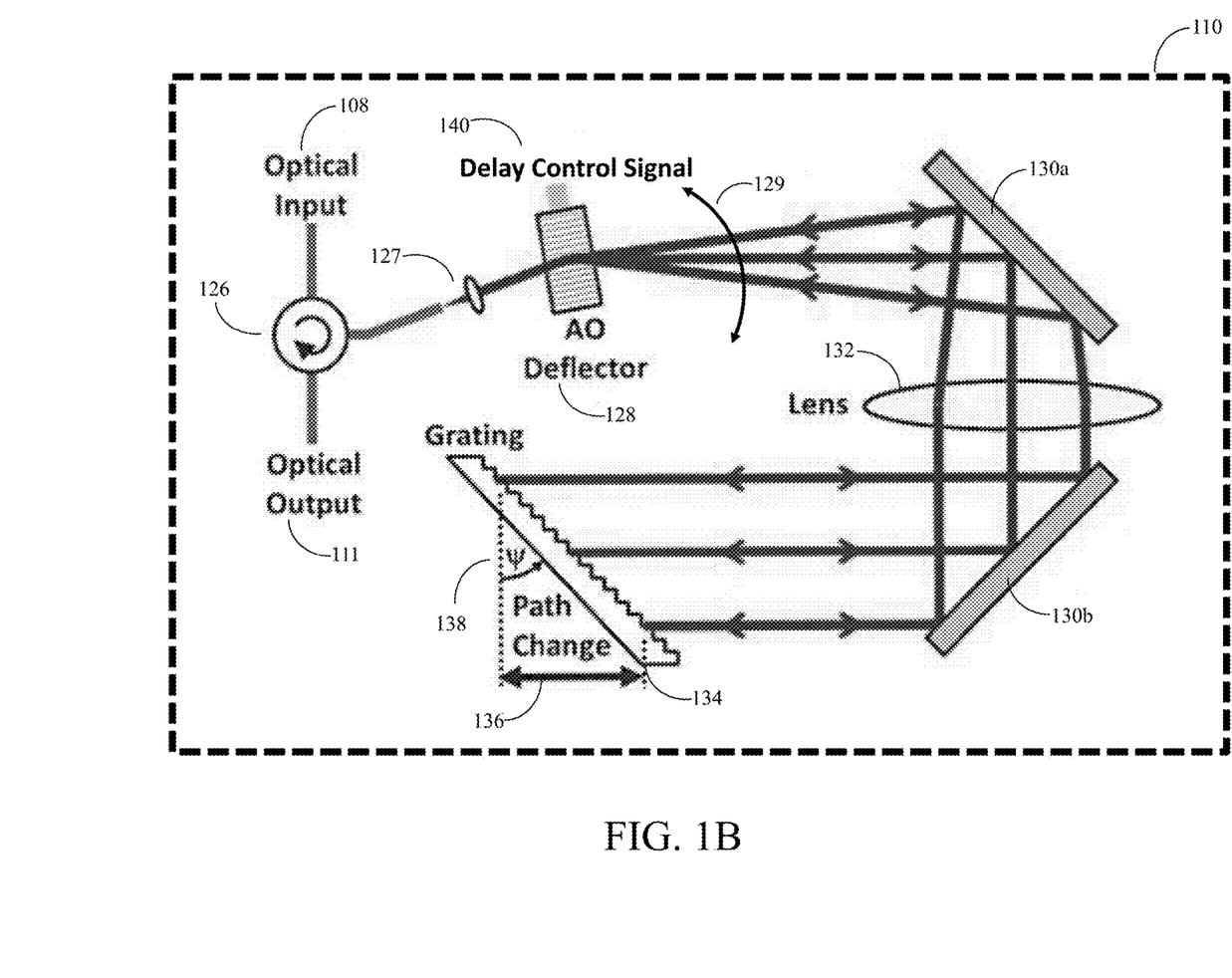
FIG. 1B is a diagram of a delay modulator of an optical sampler in accordance with an embodiment of the present disclosure.
Figure 1C:
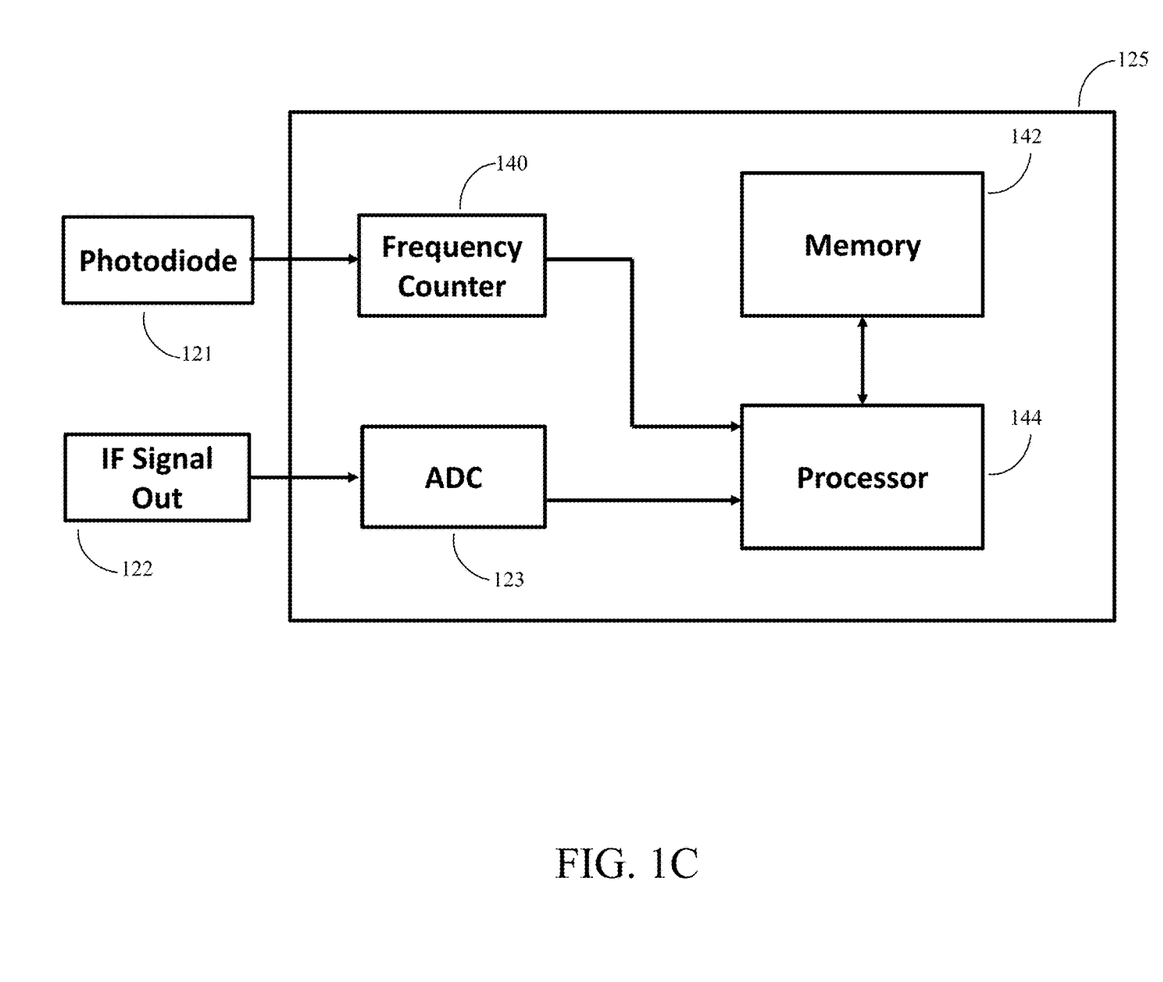
FIG. 1C is a diagram of an exemplary implementation of analyzer 125 in accordance with an embodiment of the present disclosure.

FIG. 1B is a diagram of a delay modulator 110 of an optical sampler 102 in accordance with an embodiment of the present disclosure. In an embodiment, delay modulator 110 enables input signal frequencies $f_{SIG}$ 118 above the Nyquist frequency to be aliased to output signal frequencies (e.g., $f_{IF}$ 124) within the first Nyquist zone and to enable $f_{SIG}$ 118 to be determined. In an embodiment, delay modulator 110 includes optical circulator 126, which receives light (e.g., via a fiber optic cable) at an input port from laser signal 108 generated by laser 106. In an embodiment, optical circulator 126 generates a sampling signal 111 (e.g., an optical output) that is input to EO modulator 114 (e.g., via a fiber optic cable).

In an embodiment, optical circulator 126 is coupled to an acousto-optic (AO) deflector 128 (e.g., via one or more fiber optic cables). In an embodiment, these fiber optic cables can send light from circulator 126 and can also send light to circulator 126. In an embodiment, lens 127 collimates light sent from circulator 126 to AO deflector 128 and focuses light sent from AO deflector 128 to circulator 126.

In an embodiment, mirrors 130 reflect light sent from AO deflector 128 to grating 134. In an embodiment, lens 132 collimates light between mirror 130a and mirror 130b. In an embodiment, AO deflector 128 can change 129 direction of light sent to mirror 130a. This change in direction 129 enables AO deflector 128 to sweep light across mirror 130, thereby changing the path length of the light. In an embodiment, AO deflector 128 can rapidly change direction 129

(e.g., between 10 kHz to 100 MHz), which increases the frequency offset between the carrier and the sideband, which enables an analyzer (e.g., analyzer 125) to measure wider bandwidth input signals (e.g., based on output signal 122).

In an embodiment, diffraction grating of grating 134 can act as a spatial filter, reducing the optical bandwidth of sampler 102. In an embodiment, this reduced bandwidth can be sufficient to enable sub-sampling over a frequency range limited by other components of sampled photonic link 104.

In an embodiment, grating 134 (e.g., diffraction grating) is oriented in littrow configuration (i.e., incident angle same as return angle) at an angle $\Psi$ 138 of tilt that causes a change in the path length of the light. In an embodiment, the change in path length of grating 134 is on the order of centimeters. In an embodiment, the change in path length corresponds to a change in time delay. In an embodiment, light with changed path length is sent back to optical circulator 126 via AO deflector 128, and optical circulator 126 outputs light with changed path length (and thus changed time delay) via sampling signal 111. In an embodiment, this change in time delay enables delay modulator 110 to vary, based on the change in time delay determined by delay modulator 110, the inter-pulse timing of laser 106.

In an embodiment, non-uniform sampling can be accomplished by modulating the delay of delay modulator 110 according to the expression:

$$\Delta\tau = \tau_{01} \sin(2\pi f_{M1} t) + \tau_{02} \text{saw}(f_{M2} t) \quad (3)$$

where t represents time, $\tau_{01}$ and $\tau_{02}$ are the delay modulation (DM) amplitudes at modulation frequencies $f_{M1}$ and $f_{M2}$, respectively, and $$\text{saw}(x) = x - \text{floor}(x + \tfrac{1}{2}) \quad (4)$$

is the sawtooth waveform.

In an embodiment, delay controller 112 includes a function generator configured to generate one or more delay control signals input to delay modulator 110 and (optionally) an amplifier. In an embodiment, delay controller inputs delay control signal(s) 140 to AO deflector 128. In an embodiment, delay control signal(s) 140 control the angle of deflection of AO deflector 128, which enables AO deflector to change direction 129 of light transmitted to mirror 130a. In an embodiment, delay control signal(s) 140 can also be used to change the rate of the change of direction 129 of light transmitted to mirror 130a. In an embodiment, delay controller 112 can apply a frequency-modulated (FM) voltage signal to AO deflector 128 of delay modulator 110.

In an embodiment, the mapping of input signal frequency $f_{SIG}$ 118 to output signal frequency $f_{IF}$ 124 due to aliasing can be described in the case of uniform sampling by Equations (1) and (2).

In an embodiment, since non-uniform sampling can amount to modulation of pulse spacing of laser 106, Equation (1) and its associated Nyquist zone definitions remain valid with the caveat that $f_{IF}$ 124 represents the output signal carrier frequency. In an embodiment, the uniform sampling frequency $f_s$ 108 corresponds to the pulse repetition frequency of laser 106.

4. Exemplary Results

In an embodiment, each discrete input signal frequency between 0-40 GHz predicted by Equation (1) to produce the same 6.25 MHz output signal frequency was launched sequentially into the sub-sampled photonic link using ADC 123, while the output signal was monitored using analyzer 125. Each discrete input signal frequency $f_{SIG}$ 118 aliased to the same output signal frequency $f_{IF}$ 124, confirming that the selected inputs were ambiguous with respect to sub-sampling. The output signal frequency 6.25 MHz lied approximately halfway between the extremes (center and edge) of the first Nyquist zone.

Figure 2A:
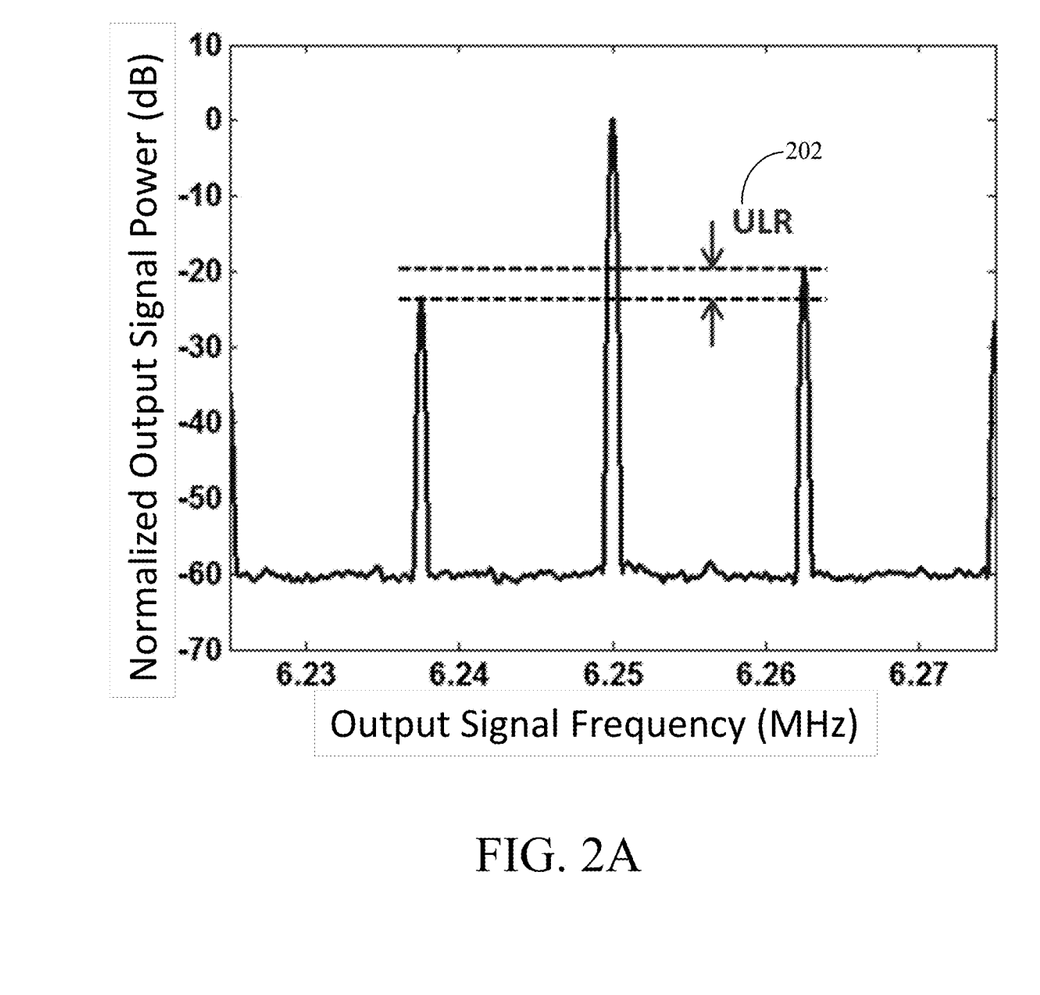
FIG. 2A is a diagram illustrating non-uniform optical sampling using a complex delay modulation waveform in accordance with an embodiment of the present disclosure.

In an embodiment, although each selected input signal frequency aliased to the same output signal frequency, non-uniform sampling added modulation sidebands to the output signal (see, e.g., FIG. 2A). With sinusoidal delay modulation, the upper and lower modulation sidebands, offset from the carrier by $+f_{M1}$ and $-f_{M1}$, respectively, had equal power. The sideband-to-carrier power ratio (SCR) varied with Nyquist zone, scaling approximately as $[\text{floor}(N/2)]^2$. The measured SCR therefore represents a coarse indicator of the Nyquist zone, able to distinguish pairs of Nyquist zones, but not Nyquist zone parity.

Non-uniform sampling with a sawtooth delay waveform produced a different result. With sawtooth DM, the upper and lower modulation sidebands, offset from the carrier by $+f_{M2}$ and $-f_{M2}$, respectively, had unequal power. The upper sideband-to-lower sideband power ratio (ULR) varied with Nyquist zone parity (i.e. whether N was even or odd). The measured ULR therefore represents a fine indicator of the Nyquist zone, able to distinguish zone parity.

FIG. 2A is a diagram illustrating non-uniform optical sampling using a complex delay modulation waveform in accordance with an embodiment of the present disclosure. In FIG. 2A, element 202 shows the upper-to-lower sideband power ratio (ULR). In an embodiment, non-uniform optical sampling enables full frequency disambiguation using a single optical sampler (and, e.g., analysis of $f_{IF}$ 124 using analyzer 125).

Figure 2B:
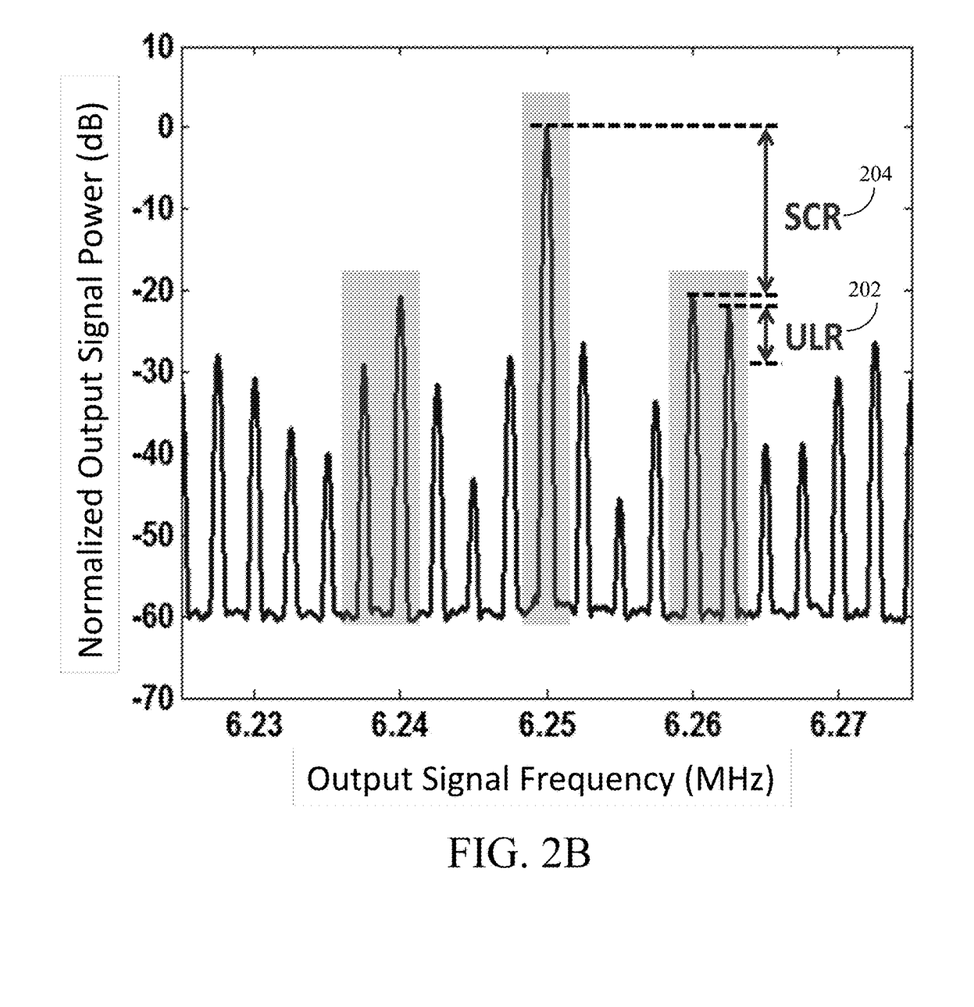
FIG. 2B is a diagram illustrating sidebands added to output signal in accordance with an embodiment of the present disclosure.

FIG. 2B is a diagram illustrating sidebands added to output signal 122 in accordance with an embodiment of the present disclosure. In FIG. 2B, element 204 shows the sideband-to-carrier power ratio (SCR). In an embodiment, modulation sidebands uniquely identify the input signal frequency, despite sub-sampling. In an embodiment, this was demonstrated across 1584 Nyquist zones (0-40 GHz at 50.5 MHz sampling rate).

Together, the fine and coarse frequency indicators SCR and ULR provide sufficient information to disambiguate the input signal frequency of the sub-sampled photonic link. For this reason, sinusoidal and sawtooth DM waveforms were simultaneously applied to delay modulator 110 ($\tau_{01} = \tau_{02} = 3.15$ ps, $f_{M1} = 10$ kHz, $f_{M2} = 12.5$ kHz), resulting in the output signal spectrum in FIG. 2B. The SCR 204 was measured at 10 kHz offset from the carrier, and the ULR 202 at 12.5 kHz offset, as shown.

Figure 3A:
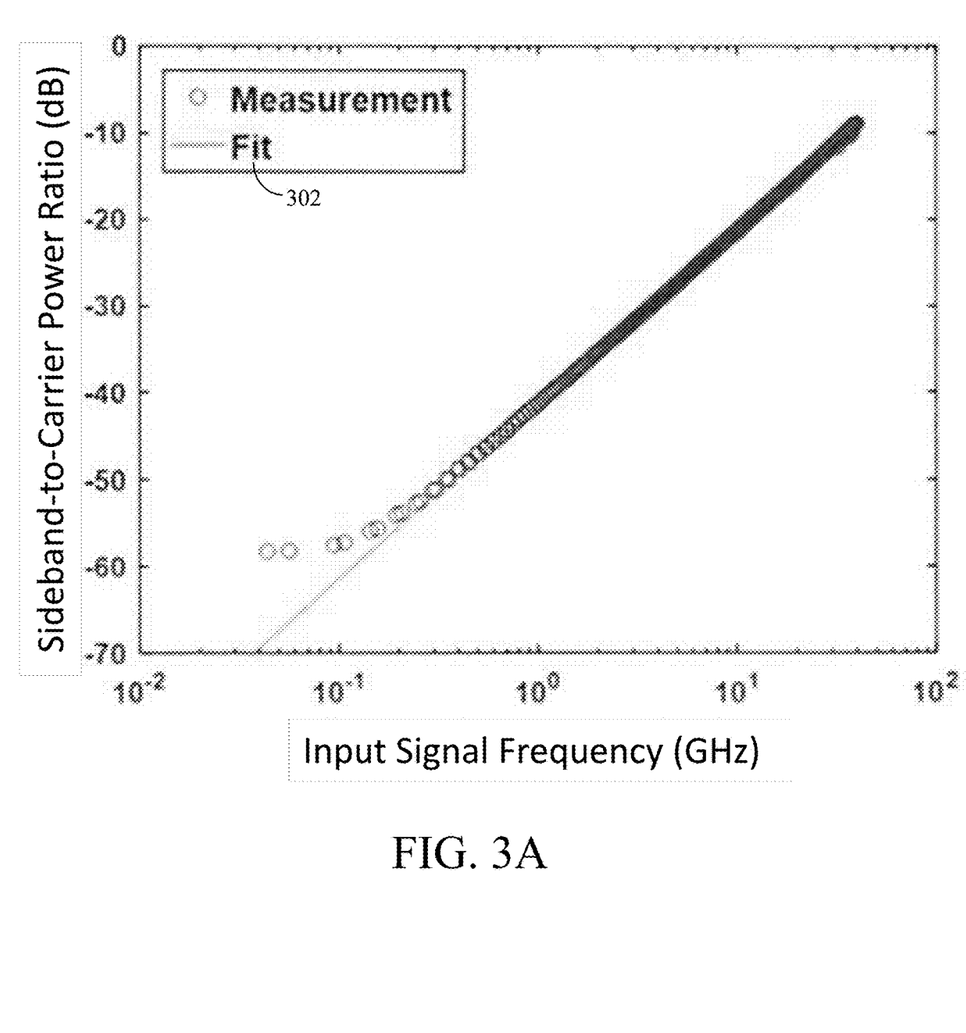
FIG. 3A is a diagram of the ratio of output powers of the sideband signal in the output signal and the carrier signal in the output signal at a delay modulation frequency of 10 kHz in accordance with an embodiment of the present disclosure.
Figure 3B:
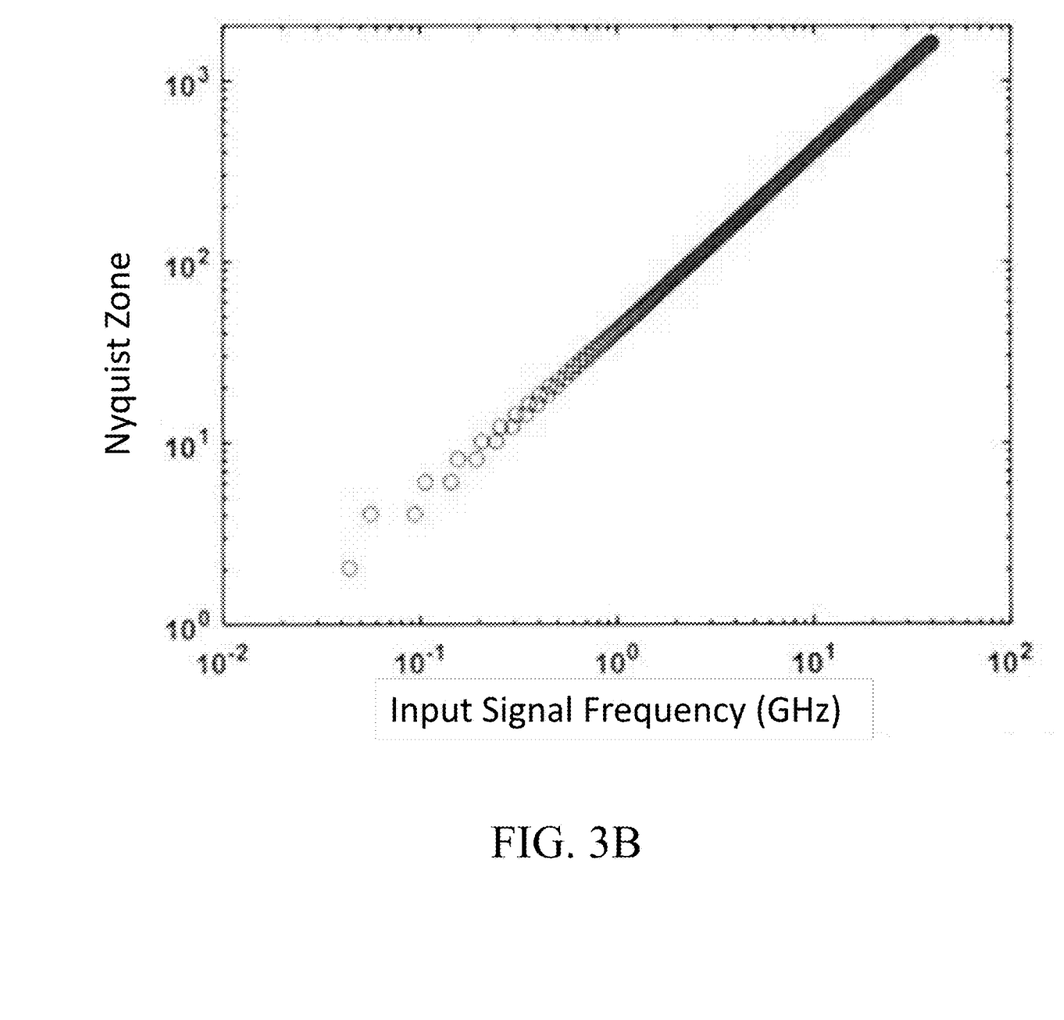
FIG. 3B is a diagram of the Nyquist zone vs. input signal frequency for FIG. 3A in accordance with an embodiment of the present disclosure.

FIG. 3A is a diagram of the ratio of output powers of the sideband signal in the output signal and the carrier signal in the output signal at a delay modulation frequency of 10 kHz in accordance with an embodiment of the present disclosure. FIG. 3B is a diagram of the Nyquist zone vs. input signal frequency for FIG. 3A in accordance with an embodiment of the present disclosure. FIG. 3A plots the measured sideband-to-carrier power ratio, for signal frequencies corresponding to the first 1600 Nyquist zones and the same output signal (carrier) frequency 6.25 MHz. A fit 302 to the data, with $f_{SIG}^2$ dependence, is also shown.

Figure 4A:
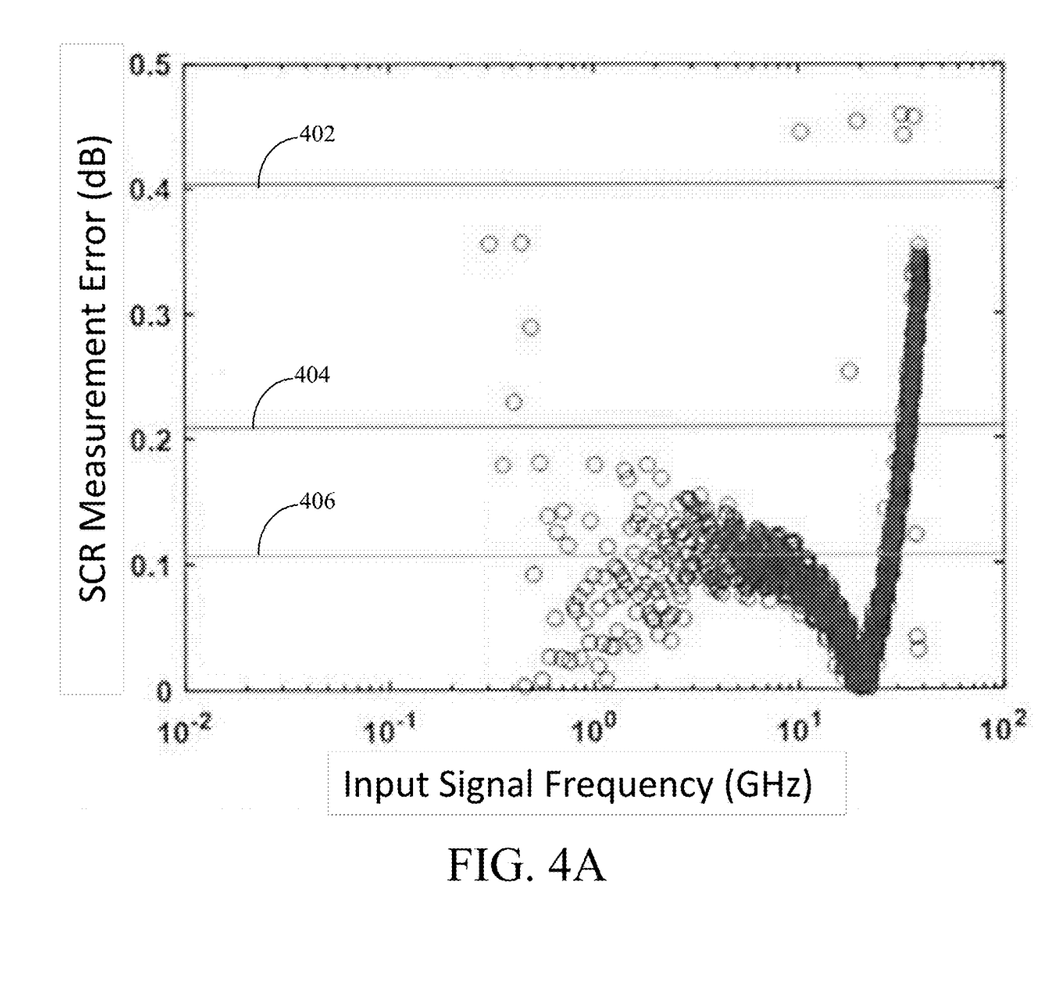
FIG. 4A is a diagram of a comparison of measured sideband-to-carrier power ratio to that of the fit in accordance with an embodiment of the present disclosure.

FIG. 4A is a diagram of a comparison of measured sideband-to-carrier power ratio to that of the fit 302 in accordance with an embodiment of the present disclosure. FIG. 4A plots the error between the fit 302 and measured data illustrated by FIG. 3A, as well as maximum error for disambiguation of adjacent even/odd Nyquist zone pairs up to zones N=40, 80, and 160. In FIG. 4A, line 402 shows the 40 zone limit, line 404 shows the 80 zone limit, and line 406 shows the 160 zone limit. In an embodiment, error was sufficiently low to allow adjacent pairs of even/odd zones, for zone 5 up to approximately 80, to be distinguished using the sideband-to-carrier power ratio.

Figure 4B:
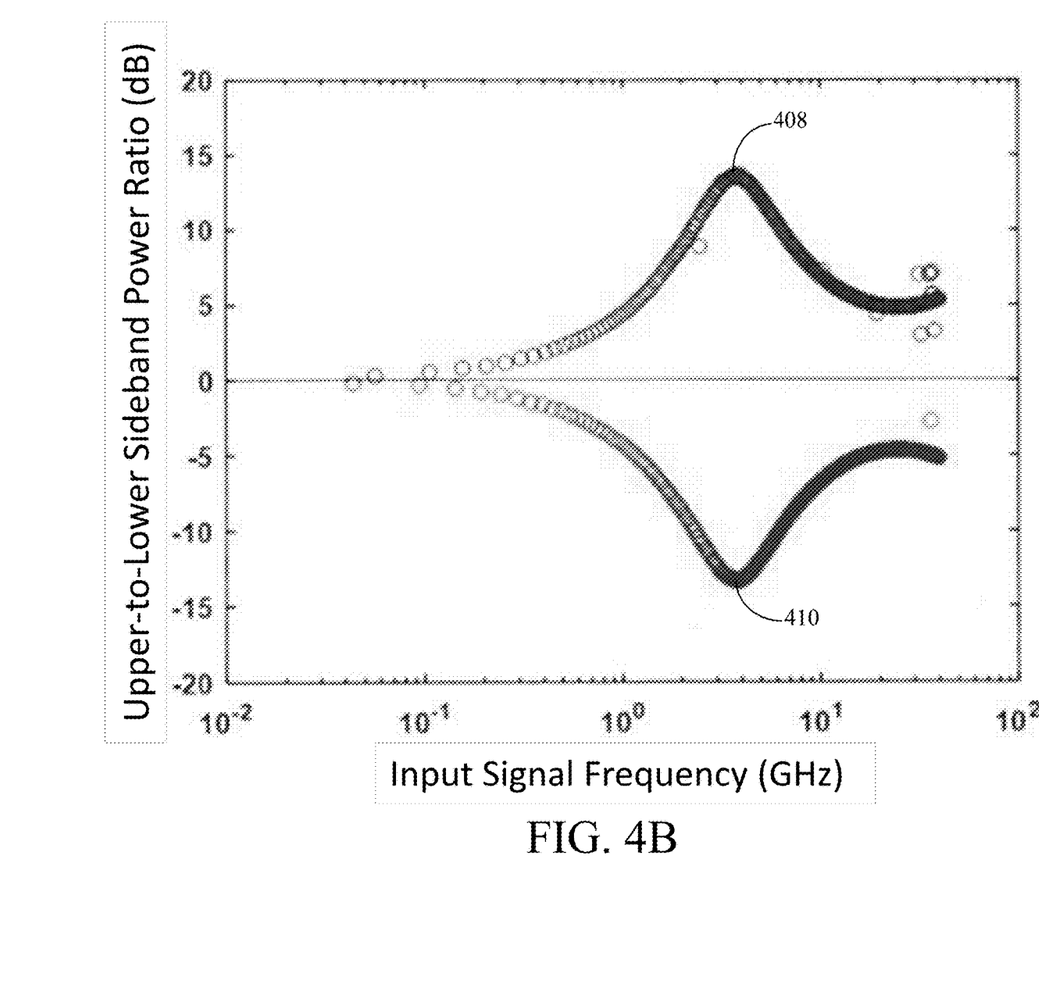
FIG. 4B is a diagram of the ratio of output powers in the upper and lower modulation sidebands, at a delay modulation frequency of 12.5 kHz, in accordance with an embodiment of the present disclosure.

FIG. 4B is a diagram of the ratio of output powers in the upper and lower modulation sidebands, at a delay modulation frequency of 12.5 kHz, in accordance with an embodiment of the present disclosure. FIG. 4B plots the upper-to-lower sideband power ratio for the second modulation signal (a 12.5 kHz delay ramp). FIG. 4B shows odd Nyquist zones 408 and even Nyquist zones 410. The upper-to-lower sideband power ratio allows even Nyquist zones to be distinguished from odd Nyquist zones. Thus, by delay modulation of the pulsed optical source (non-uniform optical sampling), and comparison of the sub-sampled signal and its modulation sidebands, the signal frequency can be determined.

5. Exemplary Method for Determining the Frequency of an Input Signal

Figure 5:
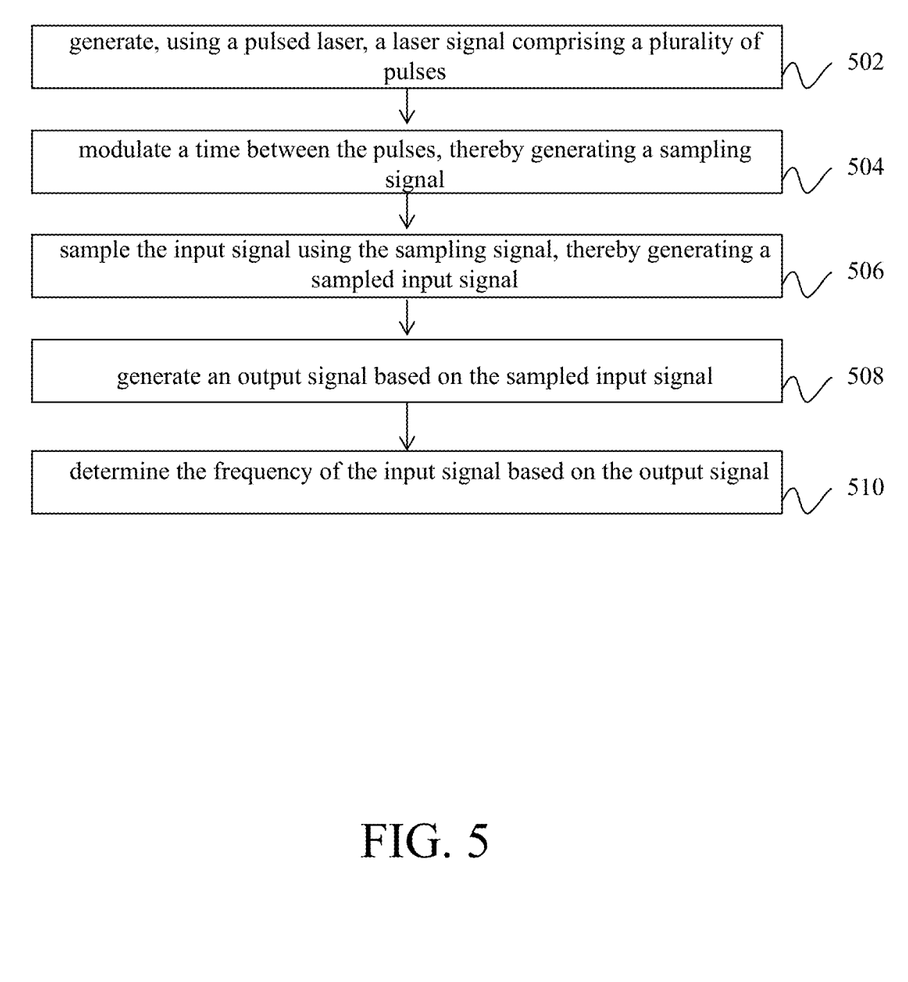
FIG. 5 is a flowchart of a method for determining the frequency of an input signal in accordance with an embodiment of the present disclosure.

FIG. 5 is a flowchart of a method for determining the frequency of an input signal in accordance with an embodiment of the present disclosure. In step 502, a laser signal comprising a plurality of pulses is generated. For example, in an embodiment, laser 106 generates laser signal $f_s$ 108.

In step 504, a time between the pulses is modulated, thereby generating a sampling signal. For example, in an embodiment, delay modulator 110 modulates, based on a control signal from delay controller 112, a time between pulses of laser signal $f_s$ 108, thereby generating sampling signal 111.

In step 506, the input signal is sampled using the sampling signal, thereby generating a sampled input signal. For example, in an embodiment, input signal 116 is received by EO modulator 114, and EO modulator 114 samples input signal 116 using sampling signal 111.

In step 508, an output signal is generated based on the sampled input signal. For example, in an embodiment, photodiode 120 generates output signal 122 based on the output from EO modulator 114.

In step 510, the frequency of the input signal is determined based on the output signal. For example, in an embodiment, output signal 122 can be analyzed by analyzer 125 to determine the frequency of input signal 116. In an embodiment, output signal 122 can be converted to a digital format by ADC 123 prior to being analyzed.

Figure 6:
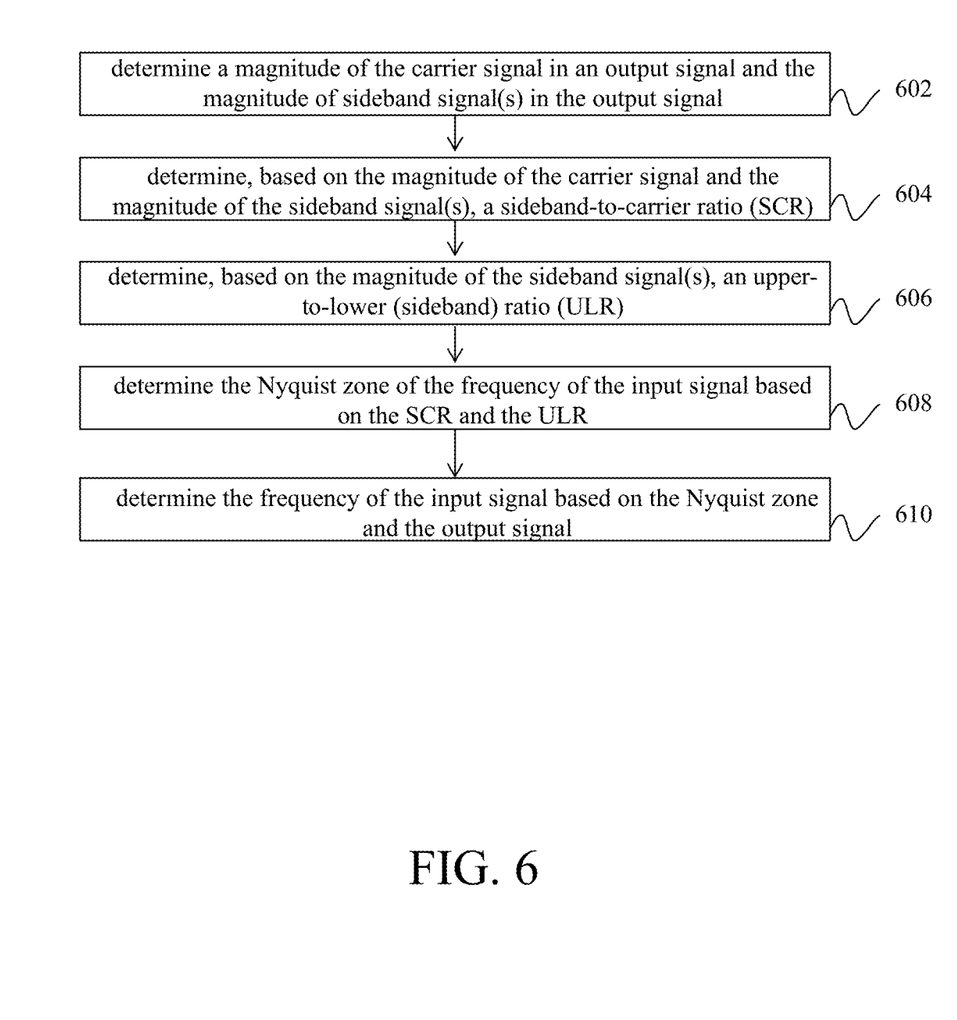
FIG. 6 is a flowchart of a method for determining the frequency of an input signal based on an output signal in accordance with an embodiment of the present disclosure.

FIG. 6 is a flowchart of a method for determining the frequency of an input signal based on an output signal in accordance with an embodiment of the present disclosure. In step 602, a magnitude of the carrier signal in an output signal and the magnitude of sideband signal(s) in the output signal are determined. For example, in an embodiment, processor 144 can determine the magnitude of carrier signal in an output signal and the magnitude of sideband signal(s) in the output signal based on information from ADC 123.

In step 604, a sideband-to-carrier power ratio (SCR) is determined based on the magnitude of the carrier signal and the magnitude of the sideband signal(s). For example, in an embodiment, ADC 123 can digitize output signal 122, and processor 144 can determine, based on the digitized signal, the magnitude of the carrier signal and the magnitude of the sideband signal(s). For example, in an embodiment, processor 144 can determine the magnitude of an upper sideband and a lower sideband in output signal 122.

In step 606, an upper-to-lower sideband power ratio (ULR) is determined based on the magnitude of the sideband signal(s). For example, in an embodiment, processor 144 can determine the magnitude of the upper and lower sideband signals.

In step 608, the Nyquist zone N of the frequency of the input signal is determined based on the SCR and the ULR. For example, in an embodiment, processor 144 can determine the Nyquist zone N of the input signal frequency $f_{SIG}$ 118 of the input signal 116 based on the SCR and the ULR. For example, in an embodiment, processor 144 can determine the constant M based on the expression below:

$$M = \frac{2\sqrt{SCR}}{\pi f_s \tau_{01}} \qquad (5)$$

In an embodiment, M is related to the Nyquist zone N based on Equation (2). In an embodiment, processor 144 can determine the parity of N based on whether the ULR is greater than or less than 1. For example, if the ULR is greater than 1, the parity of N is odd, and if the ULR is less than 1, the parity of N is even. In an embodiment, processor 144 can determine the Nyquist zone N of the input signal frequency $f_{SIG}$ 118 of the input signal 116 based on M and the parity of N.

In step 610, the frequency of the input signal is determined based on the Nyquist zone and the frequency of the output signal. For example, in an embodiment, processor 144 can determine the input signal frequency $f_{SIG}$ 118 of the input signal 116 using the expression:

$$f_{SIG} = f_{IF} + \left(\frac{N-1}{2}\right) f_s \qquad (6)$$

6. Exemplary Advantages

Embodiments of the present disclosure provide systems and methods that enable a combination of a delay modulator and pulsed laser (such as a mode-locked laser) to form a non-uniform optical sampler, which results in substantially higher optical bandwidth and thus higher signal frequency bandwidth when compared with that of conventional systems.

Embodiments of the present disclosure provide systems and methods that enable a combination of an acousto-optic delay modulator (AODM) and pulsed optical source (such as a pulsed laser) to form a non-uniform optical sampler. This enables the time delay between pulses to be varied/modulated, with high fidelity, over a range that is on the order of hundreds of picoseconds. This delay range is of practical importance for the determination of signal frequencies in the UHF, SHF, EHF, and THF frequency bands (e.g., 0.3 to 3000 GHz). Conventional systems for optical sampling utilized electro-optic phase modulators (to vary the time delay between pulses), which only provide a delay range on the order of hundreds of femtoseconds (orders of magnitude lower than the AODM).

Embodiments of the present disclosure enable optically sampling/sub-sampling a signal (e.g., a radio frequency (RF) signal, an optical signal, or a signal on an optical carrier) at a modulated, non-uniform rate. Embodiments of the present disclosure enable converting the frequency of a signal (e.g., a radio frequency (RF) signal, an optical signal, or a signal on an optical carrier), via optical sub-sampling at a modulated, non-uniform rate. Embodiments of the present disclosure enable determining the frequency of a signal (either an optical signal or a signal on an optical carrier), via optical sub-sampling at a modulated, non-uniform rate.

Embodiments of the present disclosure enable the use of specific delay modulation waveforms to determine the frequency of a sub-sampled signal (e.g., a radio frequency (RF) signal, an optical signal, or a signal on an optical carrier). For example, sinusoidal delay modulation was used to distinguish between different even or different odd Nyquist zones, and a second ramp-shaped delay modulation was used to distinguish between even and odd Nyquist zones. Conventional systems did not allow even and odd Nyquist zones to be distinguished.

7. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. An optical sampler, comprising:
a pulsed laser configured to generate a laser signal comprising plurality of pulses;
a delay controller configured to generate a control signal; and
an acousto-optic (AO) delay modulator, coupled to the pulsed laser and the delay controller, wherein the delay modulator is configured to:
receive the laser signal,
modulate, based on the control signal, a time between the pulses, and
generate a sampling signal based on the modulated time between the pulses.

2. The optical sampler of claim 1, wherein the laser signal is uniformly spaced, and wherein the sampling signal is non-uniformly spaced.

3. The optical sampler of claim 1, wherein the delay controller is configured to generate a plurality of control signals, and wherein the delay modulator is configured to modulate the time between the pulses based on the plurality of control signals.

4. The optical sampler of claim 1, wherein the delay modulator comprises:
an optical circulator configured to:
receive the laser signal; and
generate the sampling signal.

5. The optical sampler of claim 4, wherein the delay modulator further comprises:
an acousto-optic deflector, wherein the optical circulator is further configured to:
send an output light signal to the AO deflector; and
receive an input light signal from the AO deflector.

6. The optical sampler of claim 5, wherein the AO deflector is configured to:
receive the laser signal from the circulator;
receive the control signal;
change, based on the control signal, an angle of deflection of the AO deflector;
generate a deflected light signal based on the angle of deflection; and
receive an incoming reflected light signal.

7. The optical sampler of claim 6, wherein the AO deflector is further configured to:
rapidly change the angle of deflection of the AO deflector such that a frequency offset between each carrier and modulation sideband of the sampling signal is increased.

8. The optical sampler of claim 6, wherein the delay modulator further comprises:
a grating configured to:
receive the deflected light signal; and
generate the incoming reflected light signal.

9. The optical sampler of claim 8, wherein the grating is configured to control an optical bandwidth of the sampling signal.

10. The optical sampler of claim 8, wherein the grating is configured to change a path length of the deflected light signal, thereby generating the incoming reflected light signal, and wherein the change in path length corresponds to a change in time delay between the laser signal and the sampling signal.

11. The optical sampler of claim 10, wherein the change in time delay enables the delay modulator to vary inter-pulse timing of the laser signal.

12. A system for sampling an input signal, the system comprising:
 a pulsed laser configured to generate a laser signal comprising plurality of pulses;
 an acousto-optic (AO) delay modulator, coupled to the pulsed laser, wherein the acousto-optic delay modulator is configured to modulate a time between pulses of the laser signal, thereby generating a sampling signal;
 an electro-optic modulator, coupled to the acousto-optic delay modulator, configured to:
  receive the input signal, and
  sample, using the sampling signal, the input signal; and
 a photodiode, coupled to the electro-optic modulator, wherein the photodiode is configured to generate an output signal.

13. The system of claim 12, wherein the sampling signal is configured to sub-sample the input signal, and thereby alias first frequencies in the input signal that are above a Nyquist frequency of the laser signal to second frequencies within a first Nyquist zone of the laser signal.

14. The system of claim 12, further comprising:
 an analog-to-digital converter (ADC) coupled to the photodiode, wherein the ADC is configured to convert the output signal into a digital output signal; and
 a processor, coupled to the ADC, wherein the processor is configured to determine the frequency of the input signal based on the digital output signal.

15. The system of claim 12, wherein the AO delay modulator is configured to control an optical bandwidth of the sampling signal.

16. The system of claim 12, further comprising:
 a delay controller configured to generate a control signal, wherein the delay modulator is configured to modulate the time between the pulses of the sampling signal based on the control signal.

17. A method for determining a frequency of an input signal, the method comprising:
 generating, using a pulsed laser, a laser signal comprising a plurality of pulses;
 modulating a time between the pulses, thereby generating a sampling signal;
 sampling the input signal using the sampling signal, thereby generating a sampled input signal;
 generating an output signal based on the sampled input signal; and
 determining the frequency of the input signal based on the output signal.

18. The method of claim 17, wherein determining the frequency of the input signal based on the output signal further comprises:
 determining a first magnitude of a carrier signal in the output signal, a second magnitude of a first sideband signal in the output signal, and a third magnitude of a second sideband signal in the output signal;
 determining, based on the first magnitude of the carrier signal and the second magnitude of the first sideband signal, a sideband-to-carrier power ratio (SCR);
 determining, based on the second magnitude of the first sideband signal and the third magnitude of the second sideband signal, an upper-to-lower sideband power ratio (ULR); and
 determining the frequency of the input signal based on the output signal, the SCR, and the ULR.

19. The method of claim 18, wherein determining the frequency of the input signal based on the output signal further comprises:
 determining a Nyquist zone of the frequency of the input signal based on the SCR and the ULR.

20. The method of claim 19, further comprising:
 determining the frequency of the input signal based on the Nyquist zone and the output signal.

* * * * *